US008909635B2

(12) United States Patent
Petri

(10) Patent No.: US 8,909,635 B2
(45) Date of Patent: Dec. 9, 2014

(54) PROFILING CONTENT CREATION AND RETRIEVAL IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/859,042

(22) Filed: Sep. 21, 2007

(65) Prior Publication Data

US 2009/0083220 A1    Mar. 26, 2009

(51) Int. Cl.
*G06F 17/30* (2006.01)
*G06F 17/22* (2006.01)

(52) U.S. Cl.
CPC ...... *G06F 17/2205* (2013.01); *G06F 17/30011* (2013.01); *G06F 17/30997* (2013.01)
USPC .......................................... 707/732; 707/764

(58) Field of Classification Search
CPC .............. G06F 17/3089; G06F 17/30; G06F 17/30067; G06F 17/30896
USPC .......... 707/751, 754, 749, 999.005, 732, 764
See application file for complete search history.

(56) References Cited

U.S. PATENT DOCUMENTS

| | | | | |
|---|---|---|---|---|
| 6,598,046 | B1* | 7/2003 | Goldberg et al. | 704/243 |
| 2002/0069212 | A1* | 6/2002 | Leonardos | 707/200 |
| 2003/0028512 | A1* | 2/2003 | Stensmo | 707/1 |
| 2004/0111467 | A1* | 6/2004 | Willis | 709/203 |
| 2004/0205448 | A1* | 10/2004 | Grefenstette et al. | 715/500 |
| 2005/0022114 | A1* | 1/2005 | Shanahan et al. | 715/513 |
| 2005/0131762 | A1* | 6/2005 | Bharat et al. | 705/14 |
| 2005/0149484 | A1* | 7/2005 | Fox et al. | 707/1 |
| 2005/0192957 | A1* | 9/2005 | Newbold | 707/5 |
| 2006/0080314 | A1* | 4/2006 | Hubert et al. | 707/5 |
| 2006/0136589 | A1* | 6/2006 | Konig et al. | 709/224 |
| 2006/0168519 | A1* | 7/2006 | Torii et al. | 715/523 |
| 2006/0253771 | A1* | 11/2006 | Baschy | 715/500 |
| 2007/0073673 | A1* | 3/2007 | McVeigh et al. | 707/4 |
| 2008/0126329 | A1* | 5/2008 | Dettinger et al. | 707/4 |

OTHER PUBLICATIONS

"XHTML2 Working Group Home Page", Dec. 2010, W3C.*
"W3C Element Traversal Specification" Jul. 27, 2007, W3C.*
"W3C Extensible Markup Language (XML) 1.0", Sep. 29, 2006, W3C.*
Eric Severson, Integrating XML Publishing with a Content Management System: Best Practices, 2003, Flatirons Solutions Corporation.

(Continued)

*Primary Examiner* — Christyann Pulliam
*Assistant Examiner* — Sheryl Holland
(74) *Attorney, Agent, or Firm* — Martin & Associates, LLC; Derek P. Martin

(57) ABSTRACT

A content management system provides a profiling mechanism that automatically tags changes made to elements in a document with applicability metadata, and uses the applicability metadata when processing a request to the repository by a user to filter the query results according to a profile for the user. A profiling mapping policy defines roles for users of the content management system. When content is requested from the repository, the profiling mechanism inserts one or more additional request parameters based on the profile of the user. The results that match both the original request and the additional request parameter(s) are returned to the user. When the user views the results, additional filtering may occur to filter individual elements from the user that do match the user's profile.

5 Claims, 8 Drawing Sheets

(56) References Cited

OTHER PUBLICATIONS

Andrea Dickson, Review of XMetaL Author 5.0 DITA Edition, http://www.writersua.com/articles/XMetaL/index.html#condition, 2007.

XQuery from Wikipedia, http://en.wikipedia.org/wiki/XQuery.

XQuery 1.0: An XML Query Language, Second Edition, 2010, W3C, http://www.w3.org/TR/xquery.

* cited by examiner

```
<Profiles>
    <Profile attribute="userLevel" alias="User Level">
        <Allowed value="Novice" />
        <Allowed value="Typical" />
        <Allowed value="Expert" />
    </Profile>
    <Profile attribute="mediaType" alias="Media Type">
        <Allowed value="image" />
        <Allowed value="audio" />
        <Allowed value="video" />
    </Profile>
</Profiles>
```

FIG. 10

```
<ProfilePolicy>
    <Mapping mapToAlias="User Level">                    ← 1110
        <Condition operator="AND">
            <Condition operator="IN" systemRoleRef="contributors">
                <Value constant="CURRENT_USER_GROUPS" />
            </Condition>
            <Condition operator="LT" type="daysInRole">
                <Value val="365" />
            </Condition>
        </Condition>
        <Value val="Novice" />
    </Mapping>
    <Mapping mapToAlias="User Level">                    ← 1120
        <Condition operator="OR">
            <Condition operator="IN" systemRoleRef="all_admin">
                <Value constant="CURRENT_USER_GROUPS" />
            </Condition>
            <Condition operator="GT" type="daysInRole">
                <Value val="365" />
            </Condition>
        </Condition>
        <Value val="Expert" />
    </Mapping>
```

```
<Mapping mapToAlias="User Level">                    ←—1210
    <Condition operator="AND">
        <Condition actionRef="true" operator="IN">
            <Value val="viewDocumentAction" />
            <Value val="printDocumentAction" />
        </Condition>
        <Condition operator="OR">
            <Condition operator="IN" systemRoleRef="all_admin">
                <Value constant="CURRENT_USER_GROUPS" />
            </Condition>
            <Condition operator="GT" type="daysInRole">
                <Value val="365" />
            </Condition>
        </Condition>
    </Condition>
    <Value val="Novice" />
    <Value val="Typical" />
    <Value val="Expert" />
</Mapping>
<Mapping mapToAlias="Media Type">                    ←—1220
    <Condition actionRef="true" operator="IN">
        <Value val="viewDocumentAction" />
    </Condition>
    <Value val="image" />
    <Value val="audio" />
    <Value val="video" />
</Mapping>
<Mapping mapToAlias="Media Type">                    ←—1230
    <Condition actionRef="true" operator="IN">
        <Value val="printDocumentAction" />
    </Condition>
    <Value val="image" />
</Mapping>
</ProfilePolicy>
```

```
<Label>
    <Name></Name>
    <Description></Description>
    <Formula></Formula>
    <ActiveIngredients></ActiveIngredients>
    <InactiveIngredients></InactiveIngredients>
    <Media>
        <Media src="" mediaType="image"/>
        <Media src="" mediaType="video"/>
        <Media src="" mediaType="audio"/>
    </Media>
</Label>
```

```
<Label>
    <Name userLevel="Novice">Sneeze Free</Name>
    <Description userLevel="Novice">This drug cures the common cold.</Description>
    <Formula></Formula>
    <ActiveIngredients></ActiveIngredients>
    <InactiveIngredients></InactiveIngredients>
    <Media>
        <Media src="" mediaType="image"/>
        <Media src="" mediaType="video"/>
        <Media src="" mediaType="audio"/>
    </Media>
</Label>
```

```
<Label>
    <Name userLevel="Novice">Sneeze Free</Name>
    <Description userLevel="Novice">This drug cures the common cold.</Description>
    <Formula></Formula>
    <ActiveIngredients userLevel="Expert">A, B, C</ActiveIngredients>
    <InactiveIngredients userLevel="Expert">X, Y, Z</InactiveIngredients>
    <Media>
        <Media userLevel="Expert" src="/images/img1.jpg" mediaType="image"/>
        <Media userLevel="Expert" src="/videos/vid1.avi" mediaType="video"/>
        <Media userLevel="Expert" src="/audio/aud1.wav" mediaType="audio"/>
    </Media>
</Label>
```

FIG. 15

PROFILING CONTENT CREATION AND RETRIEVAL IN A CONTENT MANAGEMENT SYSTEM

BACKGROUND

1. Technical Field

This disclosure generally relates to content management systems, and more specifically relates to access to content in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Profiling is an XML content management technique in which elements of an XML document may be tagged with applicability metadata. This applicability metadata can be used by the CMS to filter content and only allow certain elements to be included. Currently, a profile for a document allows the content management system to extract only that content from the document that matches the profile. For example, a document for an owner's manual may include instructions in English and Spanish. If a new document is created with a profile of English, only the elements that match the English profile will be included in the new document. Similarly, if a new document is created with a profile of Spanish, only the elements that match the Spanish profile will be included in the new document. Profiling thus allows a way to select and filter content when a document is reconstituted (i.e., assembled) according to one or more defined profiles for the document.

Method 200 in FIG. 2 is a prior art method for reconstituting a document that may include a defined profile. Method 200 begins when a document needs to be reconstituted (step 210). The next element is retrieved (step 220). If the element has applicability metadata (step 230=YES), the element is included in the reconstituted document only if the document's profile matches the applicability metadata (step 250). If the element does not have applicability metadata (step 230=NO), the element is included in the document (step 240). If there are more elements to process (step 260=YES), method 200 loops back to step 220 and continues until there are no more elements to process (step 260=NO).

A sample document 300 is shown in FIG. 3. We assume document 300 is being reconstituted from a document that includes a link to document N 320, which includes two separate elements that each has applicability metadata. Note the document profile 310 is English. When the content management system encounters document N to incorporate into the reconstituted document 300, the CMS sees that document N 320 includes applicability metadata. Because the profile of the document 300 being reconstituted is English as shown at 310, which matches the applicability metadata for the first element 330, the first element 330 is incorporated into document 300 as shown in FIG. 3. Because the English profile of the document being reconstituted does not match the Spanish applicability metadata for the second element 340, the second element 340 is not included in the reconstituted document 300. Note that profiling may also be used when common elements are mixed with specific elements that vary based on applicability metadata. For example, a document might include a shipping address that has a street address, city and state that are common for all destinations. However, the format and location of the postal code varies depending on whether the address is an address in the United States or an address in a foreign country. In this case, there would be a single instance of the common data, with multiple instances of the postal code tagged with appropriate applicability metadata. These very simplified examples show how profiling is used in the prior art to include or exclude parts of a document depending on the profile of the document being created and the applicability metadata in the shared documents.

One known way to generate applicability metadata is shown in method 400 in FIG. 4. A user while creating or editing a document adds or edits content in the document (step 410). The user may then select content and specify applicability metadata for that content (step 420). Note, however, that the utility of a user manually defining applicability metadata that may be used in profiling is limited. Without a way for a content management system to more automatically generate and use profile data, the scope of the use of profile data in a CMS will remain limited.

BRIEF SUMMARY

A content management system (CMS) provides a profiling mechanism that automatically tags changes made to elements in a document with applicability metadata, and uses the applicability metadata when processing a request to the repository by a user to filter the query results according to a profile for the user. A profiling mapping policy defines roles for users of the content management system. When content is requested from the repository, the profiling mechanism inserts one or more additional request parameters based on the profile of the user. The results that match both the original request and the additional request parameter(s) are returned to the user. When the user views the results, additional filtering may occur to filter individual elements from the user that do not match the user's profile.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 shows sample profiles;

FIGS. 11-12 each show different portions of a sample profiling mapping policy;

FIG. 13 shows a sample XML document;

FIG. 14 shows the sample XML document shown in FIG. 13 after having been edited by a user with a novice role; and FIG. 15 shows the sample XML document shown in FIG. 14 after having been edited by a user with an expert role.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

An improved content management system is disclosed herein that includes a profiling mechanism that detects a change by a user to content in a document, and automatically stores in the document applicability metadata corresponding to the change. The profiling mechanism also uses the applicability metadata when processing a request to the repository by a user to filter the query results according to a profile for the user.

Figure 1:
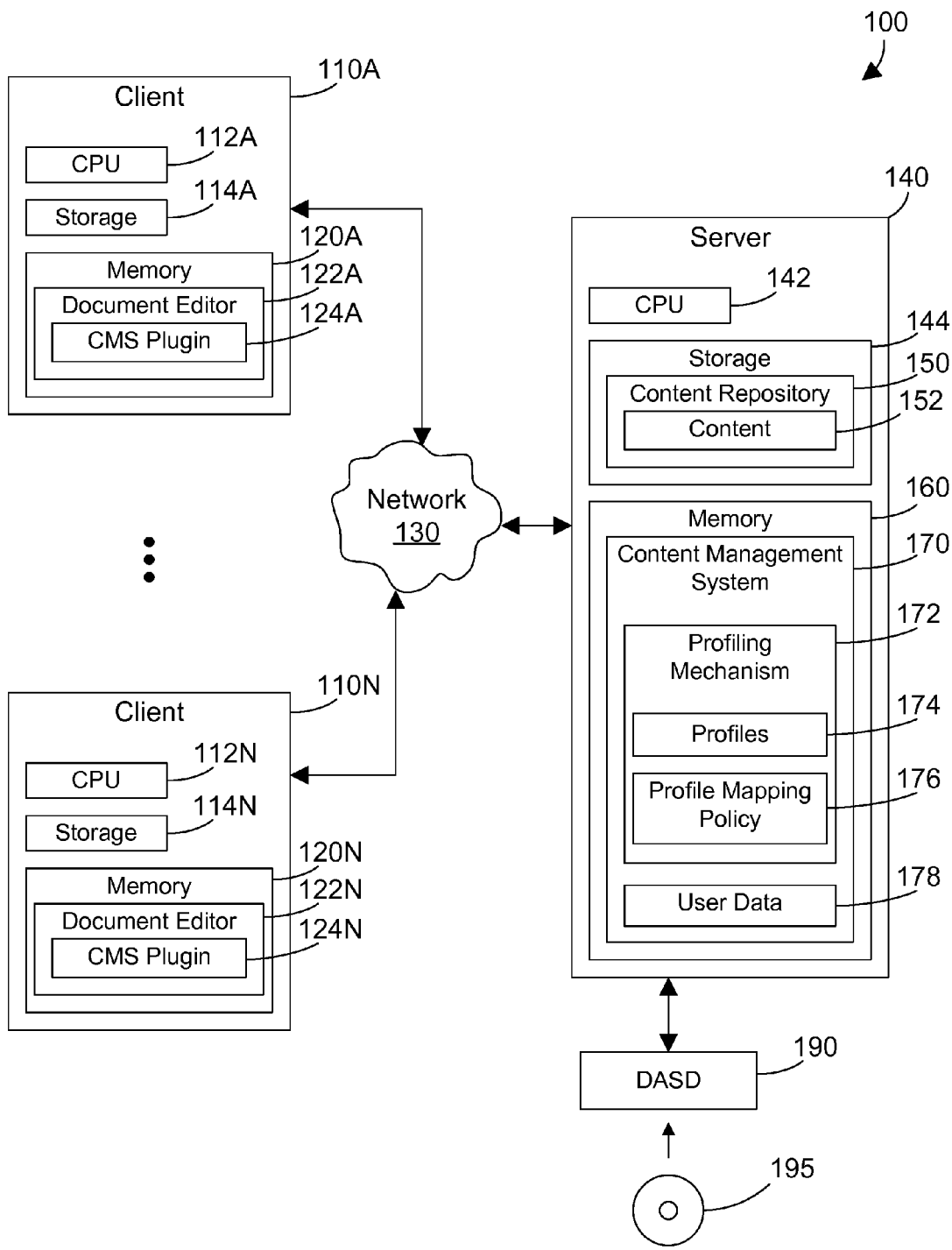
FIG. 1 is a block diagram of a networked computer system that includes a server computer system that has a content management system that includes a profiling mechanism that inserts applicability metadata for added or changed elements and inserts one or more additional search parameters into queries to the repository.
Figure 2:
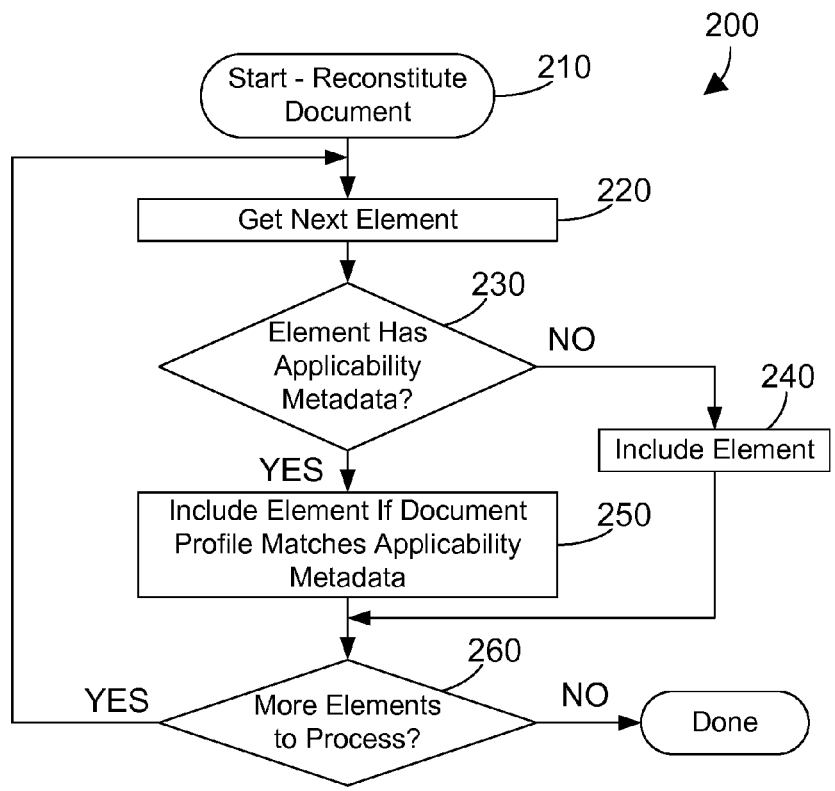
FIG. 2 is a flow diagram of a prior art method for using profiling when reconstituting a document.
Figure 3:
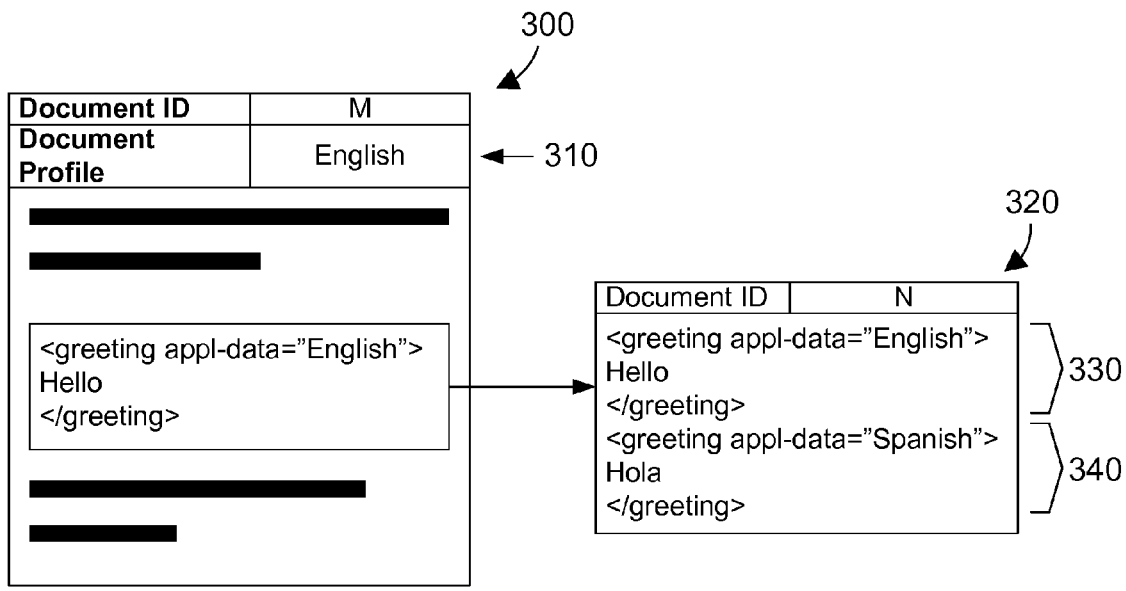
FIG. 3 is a block diagram showing a document being reconstituted that includes a profile, and content that includes applicability metadata.
Figure 4:
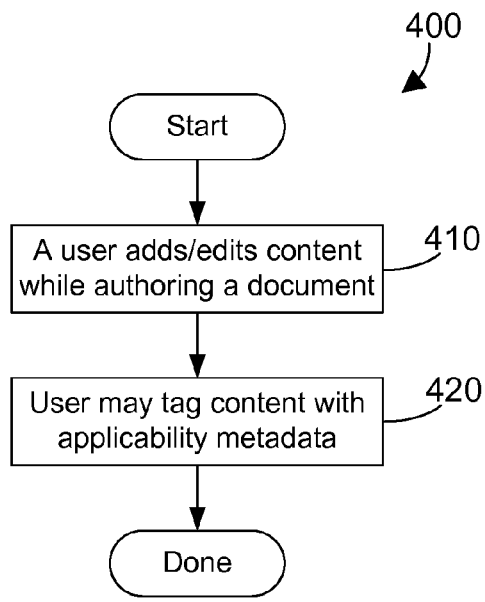
FIG. 4 is a flow diagram of a prior art method for a user to manually tag content with applicability metadata.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a profiling mechanism 172, one or more profiles 174, a profile mapping policy 176, and user data 178. Profiling mechanism 172 inserts applicability metadata for added or changed elements in a document according to the role of the user making the change, as defined in one or more profiles 174. When content is requested from the repository, the profiling mechanism 172 inserts one or more additional request parameters based on the user's profile. Profile mapping policy 176 indicates how user data 178 relates to the profiles 174. User data 178 can include, but is not limited to the role of the user, the task the user is performing, and the type of element being requested. User data 178 is used to determine one or more profiles 174 that apply to the user according to the profile mapping policy 176.

While the profiling mechanism 172 is shown in FIG. 1 as part of content management system 170 on server computer system 140, one skilled in the art will appreciate that one or more of the features of the profiling mechanism 172 could be implemented within a CMS plugin within a document editor on a client computer system, such as within CMS plugin 124A shown in FIG. 1. The disclosure and claims herein expressly extend to any suitable way to allocate different functions between a client and the server that hosts the content management system to achieve a profiling mechanism as described herein.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The content management system may also be delivered as part of a service engagement with a client corporation, non-profit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 5:
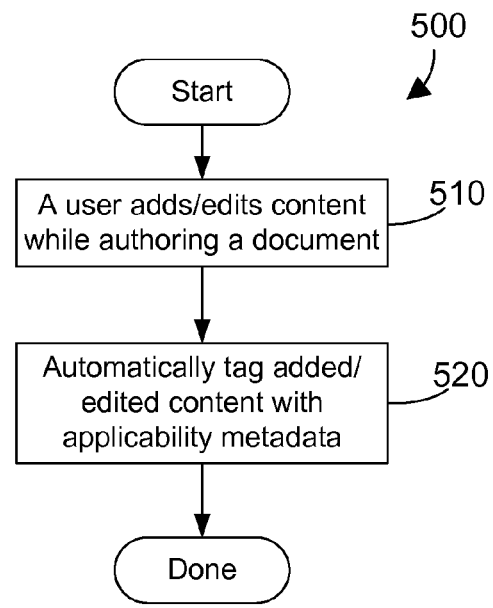
FIG. 5 is a flow diagram of a method for automatically tagging content with applicability metadata.

Referring to FIG. 5, a method 500 for automatically tagging content with applicability metadata begins with a user adding or editing content while authoring a document (step 510). When the change in step 510 is detected, the added or edited content is then automatically tagged with applicability metadata (step 520). The applicability metadata in step 520 is preferably based on the role (i.e. position, experience, etc.) of the user making the changes.

Figure 6:
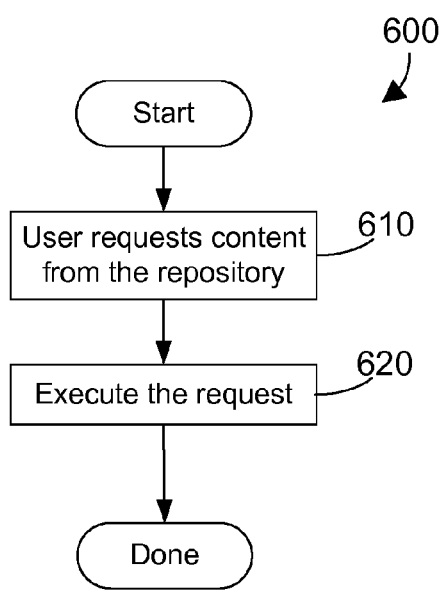
FIG. 6 is a flow diagram of a prior art method for searching the repository for content.

Referring to FIG. 6, a prior art method 600 for searching the repository for content begins with a user requesting content from the repository (step 610). The request is executed (step 620) and method 600 is done. Step 620 can be accomplished by any acceptable medium for requesting information from the repository, including, but not limited to, performing a query.

Figure 7:
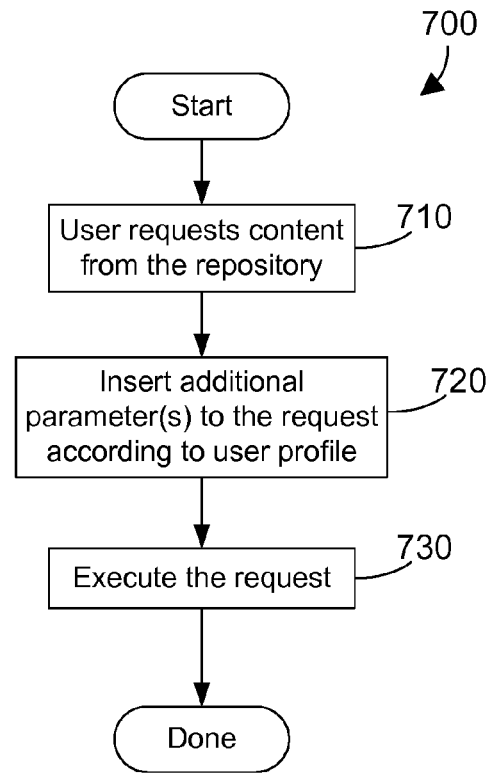
FIG. 7 is a flow diagram of a method for searching the repository for content.

Referring to FIG. 7, a method 700 for searching the repository for content begins with a user requesting content from the repository (step 710). One or more additional parameters are inserted into the request according to user data 178 and the corresponding user profile (step 720). The request is executed (step 730) and method 700 is done. Notice that step 730 could be performed in a variety of ways. One suitable implementation for step 730 would be to execute the request via an acceptable medium (i.e. a query) including the original request parameters and the additional parameter(s) from step 720 to return one result set that includes only results that match both the original request and the additional criteria from step 720. Another suitable implementation would be to execute the original request via an acceptable medium (i.e. a query) and return the results from the original request. The results from the original request would then be filtered by applying the additional parameter(s) from step 720 to then return a final result set.

Figure 8:
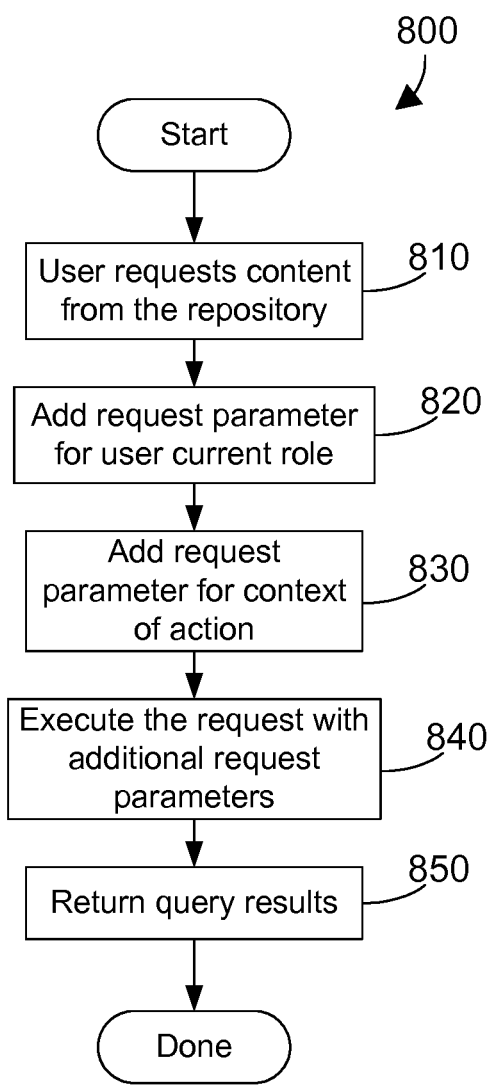
FIG. 8 is a flow diagram of one suitable implementation for method 700 shown in FIG. 7.

Referring to FIG. 8, a method 800 is one suitable implementation for method 700 shown in FIG. 7, and begins when a user requests content from the repository (step 810). An additional request parameter is added to the request to only return results that match the user's current role (step 820). Another additional request parameter is added to the request to only return results that match the context of the action being performed (step 830). The request with the additional request parameters is executed (step 840). The results from the request are returned (step 850) and method 800 is done.

Figure 9:
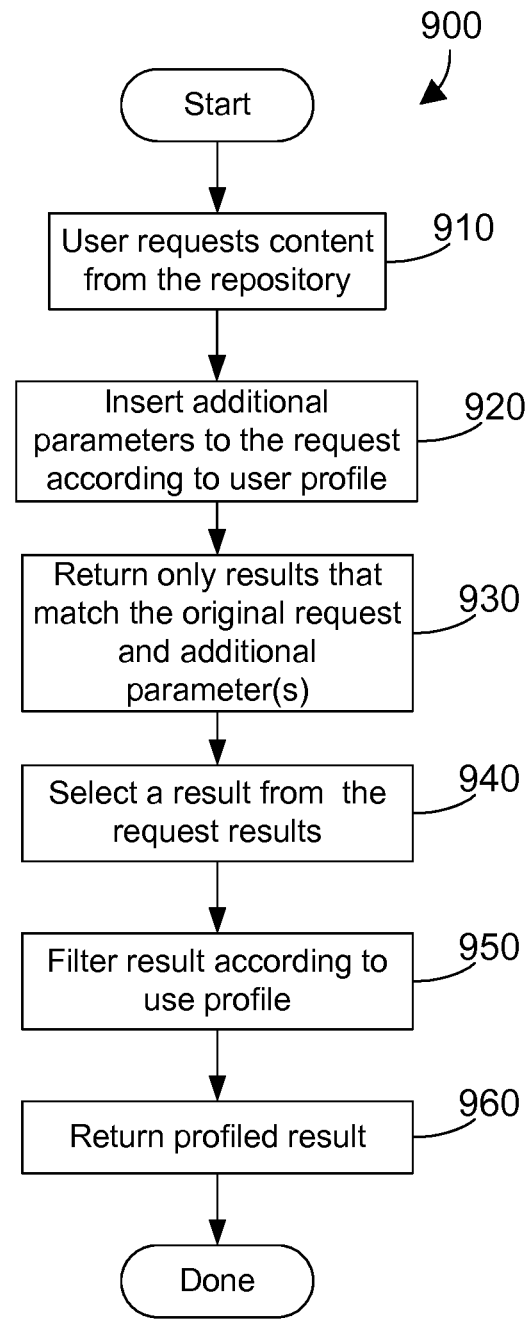
FIG. 9 is a flow diagram of a method for rendering a profiled element.

Referring to FIG. 9, a method 900 for rendering content from a repository to a user begins when the user requests content from the repository (step 910). One or more additional parameters are added to the request according to the user's profile (step 920). Only results that match the original request and additional parameter(s) are returned (step 930). A result is then selected from the returned results from step 930 (step 940). The selected result is then filtered according to the user profile (step 950). The profiled result is then returned (step 960) and method 900 is done. Step 930 allows for a variety of implementations of executing the request for content.

A simple example is now given to illustrate many of the concepts discussed above. FIG. 10 shows sample profiles for the example herein. Notice profiles 1000 include profiles for the "userLevel" and the "mediaType". The "userLevel" attribute can be present on any element, and the "mediaType" attribute can only be present on/Media elements.

FIGS. 11-12 show a sample profile mapping policy 1100 that corresponds to profiles 1000. Profile mapping policy 1100 includes a mapping 1110 that corresponds to the "userLevel" profile defined in profile configuration 1000. Mapping 1110 defines the "userLevel" profile value to be "Novice" if the user is in the "contributor" role or has been a registered user for less than 365 days. The profile of a user is preferably determined by comparing the user data 178 in FIG. 1, which may contain, for example, the number of days the user has been a registered user, with the profile mapping policy 176. Mapping 1120 also corresponds to the "userLevel" profile defined in profile configuration 1000. Mapping 1120 defines the "userLevel" profile value to be "Expert" if the user is in the "all_admin" role or has been a registered user for more than 365 days. Mapping 1210 in FIG. 12 corresponds to the "userLevel" profile defined in profile configuration 800. Mapping 1210 defines the "userLevel" profile value to be "Novice", "Typical", and "Expert" if the current action is "viewDocumentAction" or "printDocumentAction" AND the user is in the "all_admin" role or has been a registered user in the system for more than 365 days. This allows a user with an "Expert" profile to be able to view all of the changes made, no matter what user role is associated with the changes. Mapping 1220 corresponds to the "mediaType" profile defined in profiles 1000. Mapping 1220 defines the "mediaType" profile value to be "image", "audio", and "video" if the selected action is "viewDocumentAction", since viewing the element would provide all media capabilities. Mapping 1230 corresponds to the "mediaType" profile defined in profiles 1000. Mapping 1230 defines the "mediaType" profile value to be "image" if the selected action is "printDocumentAction". Notice that mapping 1230 does not include the "audio" and "video" values. This makes sense because video and audio cannot be printed.

FIG. 13 is a sample XML document before any editing has taken place. In the example herein, document 1300 is a template that has not had any elements populated yet, but the disclosure and claims herein extend to a document that is already partially or completely populated. In the case where a document is completely populated, applicability metadata is inserted as changes are made to the elements since there may be no knowledge of which user originally populated the document. FIG. 14 shows XML document 1400, which is XML document 1300 in FIG. 13 after a user in the "contributor" role who has been registered for less than 365 days has added elements. When the profiling mechanism detects the change to the <Name> element, the profiling mechanism automatically inserts the userLevel="Novice" applicability metadata in the <Name> element based on profile mapping policy 1100, as shown in FIG. 14. In similar fashion, when the profiling mechanism detects the change to the <Description> element, the profiling mechanism automatically inserts the userLevel="Novice" applicability metadata in the <Description> element based on profile mapping policy 1100, as shown in FIG. 14.

FIG. 15 shows XML document 1500 after a user who has been registered for more than 365 days has added elements to document 1400 in FIG. 14. Note that the userLevel="Expert" applicability metadata is automatically added based on profile mapping policy 1100 when the user entered data for the <ActiveIngredients>, <InactiveIngredients>, and <Media> elements.

A user need not be aware that applicability metadata tags are added as the user adds content. These tags are added without any action performed by the user, other than the user adding content. The user simply updates the document, and in response, the profiling mechanism automatically inserts appropriate applicability metadata to the changed elements behind the scenes. Another suitable implementation would be to have the user be able to choose which role the change would be applied with, but the user can only make a change based on his maximum role. For example, if an "Expert" user noticed a mistake in the <Description> element, but the <Description> element was added by a "Novice" user, the "Expert" user could change the <Description> element to correct it, but then the <Description> element would have an "Expert" tag, which would not be viewable to "Novice" users. The "Expert" user could then choose which role to tag the change with so the element can be correct and be viewable by users that need to view it.

In the example herein, assume a user who has been registered for less than 365 days (a Novice according to the profile mapping policy 1100 in FIG. 11) searches the repository to view a document that contains active ingredients "A, B, C". Notice that document 1500 is a document that contains active ingredients "A, B, C". The search will not return document 1500 to the user, because the <ActiveIngredients> element was added by a user with an "Expert" role, and the user performing the search is in a "Novice" role as defined by profile mapping policy 1100. As the user requests content, an additional request parameter "user="Novice"" is added to limit the search to elements in the repository that have <ActiveIngredients> elements applicable to a user with the "Novice" profile.

In the example herein, assume a user who has been registered for less than 365 days (a Novice) searches the repository to view a document named "Sneeze Free". Notice that document 1500 is a document that is named "Sneeze Free". The search will return document 1500 to the user, because the <Name> element was added by a user with a "Novice" role, and the user performing the search is in a "Novice" role as defined by profile mapping policy 1100. As the user requests content, an additional request parameter "user="Novice"" is added to limit the search to elements in the repository that have <Name> elements applicable to a user with the "Novice" profile. If the user then views document 1500, only the elements with a "Novice" profile are displayed to the user. Thus, document 1500 would appear to a Novice as document 1400 in FIG. 14 because the content that has applicability metadata of user="Expert" will not be rendered to the user.

In the example herein, assume a user who has been registered for more than 365 days searches the repository to view a document that contains active ingredients "A, B, C". Notice that document 1500 is a document that contains active ingredients "A, B, C". The search will return document 1500 to the user, because the <ActiveIngredients> element was added by a user with an "Expert" role, and the user performing the search is in an "Expert" role as defined by profile mapping policy 1100. As the user requests content, an additional request parameter "user="Expert"" is added to limit the search to elements in the repository that have <ActiveIngredients> elements applicable to a user with the "Expert" profile. If the user then views document 1500, because the user has been registered for more than 365 days, the elements with "Novice", "Typical", and "Expert" profiles are displayed to the user (i.e. all of the elements are displayed). Document 1500 is displayed to the expert user as shown in FIG. 15.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. A computer-implemented method for searching for content in a repository on a first computer system that includes a plurality of documents, each document including a plurality of elements, the method comprising the steps of:

receiving from a plugin on a client computer system used by a user and connected to the first computer system a request from a user for one of the plurality of documents from the repository;

in response to receiving the request from the user, modifying the request received from the plugin by inserting without further input from the user at least one additional request parameter in the request according to a role of the user;

executing the request with the additional request parameters to limit elements from the document rendered to the user to elements that satisfy the role of the user;

monitoring additions and modifications to at least one of the plurality of elements in a document by the user; and in response to the additions and modifications to the at least one of the plurality of elements in the document by the user, inserting without further input from the user applicability metadata in the document for at least one changed element according to the role of the user, wherein the applicability metadata specifies a required role level for accessing the at least one changed element;

wherein the limiting of elements from the document rendered to the user to elements that satisfy the role of the user includes the steps of:

comparing the role of the user to the required role level specified in the applicability metadata for accessing the at least one changed element; and excluding at least one element in the document from being rendered to the user when the at least one element is a changed element that has a required role level specified in the applicability metadata that is not satisfied by the role of the user, with the result of rendering some of the plurality of elements in the document to the user via the plugin and not rendering the at least one element in the document to the user via the plugin.

2. The method of claim 1 further comprising the step of: defining a profile mapping policy that indicates how user data relates to the role of the user.

3. The method of claim 2 wherein the user data comprises task the user is performing and type of element.

4. The method of claim 1 further comprising the step of: applying the role of the user when the user accesses results from the request so only elements that have applicability metadata that satisfies the role of the user is rendered to the user.

5. A computer-implemented method for searching a repository on a first computer system and only returning relevant results to a user that requested the search via a plugin on a second computer system, the method comprising the steps of:

defining a profile corresponding to a role of the user, wherein role of the user is selected from the group novice, typical and expert;

defining a profile mapping policy that indicates how the role of the user relates to the profile;

monitoring additions and modifications to at least one of a plurality of elements in a document by the user using the plugin;

in response to the additions and modifications to the at least one of the plurality of elements in the document by the user using the plugin, inserting without further input from the user applicability metadata in the document for at least one changed element according to the role of the user, wherein the applicability metadata specifies a required role level for accessing the at least one changed element;

the user submitting via the plugin a request for content from the repository;

in response to receiving the request from the user via the plugin, modifying the request by inserting into the request without further input from the user a first additional request parameter for the role of the user;

in response to receiving the request from the user via the plugin, modifying the request by inserting into the request without further input from the user a second additional request parameter for the context of the request;

in response to receiving the request from the user via the plugin, modifying the request by inserting into the request without further input from the user a third additional request parameter for the document type being requested;

executing the request with the first, second and third additional request parameters;

returning results from the request to the user via the plugin;

the user selecting one of the results;

the user performing an action to view the selected result;

removing elements from the selected result that do not satisfy the role of the user according to the profile;

removing elements from the selected result that do not satisfy the context of the action to view the selected result;

removing elements from the selected result that do not satisfy a second profile for document type; and rendering the selected result to the user via the plugin, wherein the selected result rendered to the user includes at least one changed element that has applicability metadata that is satisfied by the role of the user and excludes at least one changed element that has applicability metadata that is not satisfied by the role of the user, with the result of rendering some of the plurality of elements in the document to the user via the plugin and not rendering other of the plurality of elements in the document to the user via the plugin.

* * * * *